United States Patent [19]
Fedeli

[11] Patent Number: 5,166,849
[45] Date of Patent: Nov. 24, 1992

[54] HORIZONTAL MAGNETIC HEAD WITH HALL EFFECT AND ITS EMBODIMENT METHOD

[75] Inventor: Jean-Marc Fedeli, Beaucroissant, France

[73] Assignee: Commissariat a l'Energie Atomique, Paris, France

[21] Appl. No.: 652,994

[22] Filed: Feb. 8, 1991

[30] Foreign Application Priority Data

Feb. 21, 1990 [FR] France ............... 90 02113

[51] Int. Cl.$^5$ .............................. G11B 5/37
[52] U.S. Cl. .................... 360/112; 360/113; 360/119; 360/125
[58] Field of Search ............... 360/112, 113

[56] References Cited

U.S. PATENT DOCUMENTS

| | | | |
|---|---|---|---|
| 3,355,727 | 11/1967 | Gaubatz | 360/113 |
| 3,800,193 | 3/1974 | Ashar et al. | 317/235 H |
| 4,400,752 | 8/1983 | Chabrolle | 360/112 |
| 4,954,920 | 9/1990 | Yamada et al. | 360/113 |

FOREIGN PATENT DOCUMENTS

| | | |
|---|---|---|
| 0269129 | 6/1988 | European Pat. Off. . |
| 0284495 | 9/1988 | European Pat. Off. . |
| 970455 | 9/1964 | United Kingdom . |

OTHER PUBLICATIONS

IBM Technical Disclosure Bulletin, vol. 12, No. 12, Mar. 1970, p. 2163 "Elimination of DC Offset Potential of Hall Effect Devices", T. W. Collins et al.

Primary Examiner—John H. Wolff
Attorney, Agent, or Firm—Oblon, Spivak, McClelland, Maier & Neustadt

[57] ABSTRACT

Horizontal magnetic head with Hall effect and including a magnetic circuit composed of a first horizontal polar piece (42) and a second horizontal polar piece (98, 100) separated into two sections by a nonmagnetic spacer (102), two magnetic pillars, each connecting the sections (98, 100) of the second polar piece to one extremity of the first polar piece (42).

According to the invention, at least one of the pillars comprises a sensor with an integrated Hall effect (78, 80).

Application for magnetic recording reading and writing.

3 Claims, 5 Drawing Sheets

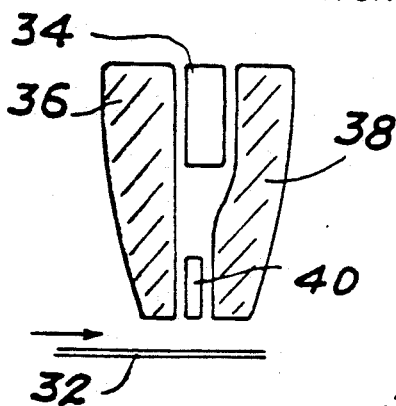
FIG. 2 PRIOR ART
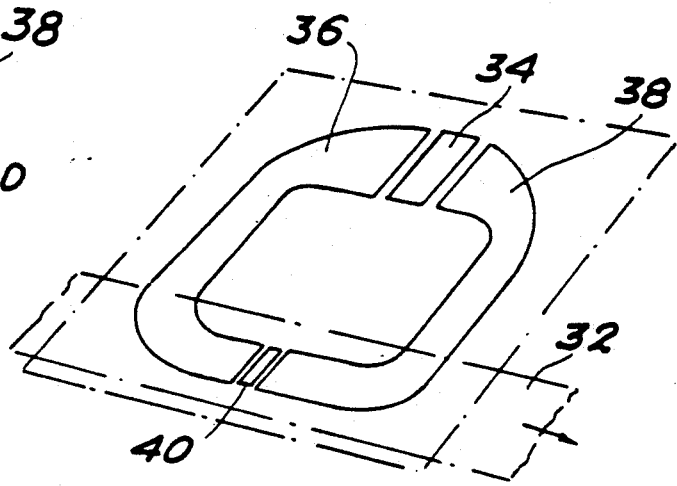
FIG. 3 PRIOR ART
FIG. 4
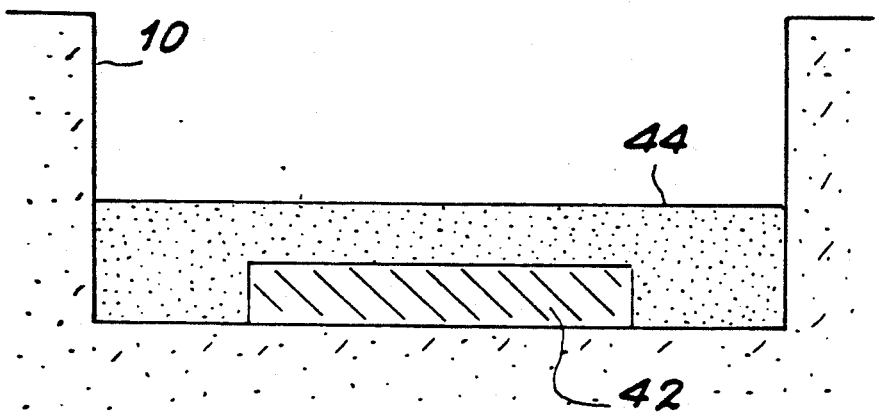
FIG. 5
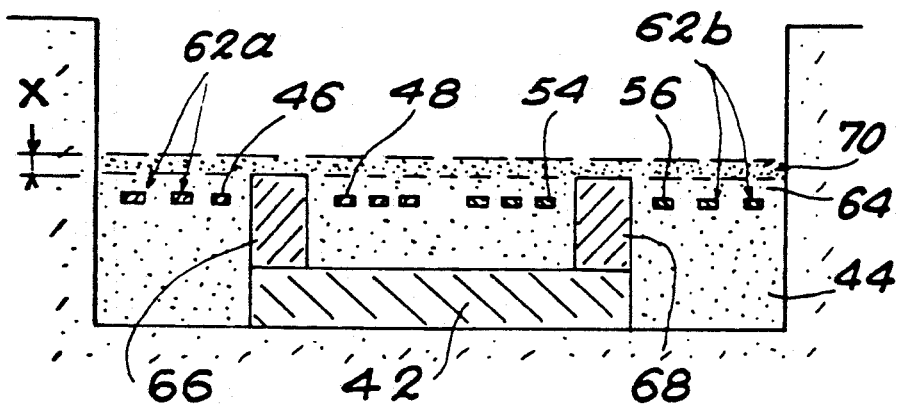

HORIZONTAL MAGNETIC HEAD WITH HALL EFFECT AND ITS EMBODIMENT METHOD

FIELD OF THE INVENTION

The present invention concerns a horizontal magnetic head with a Hall effect and its embodiment method. In particular, it is applicable to the reading of a recording on a magnetic medium, but also to writing on such a medium.

BACKGROUND OF THE INVENTION

The structure of a reading and writing horizontal head for longitudinal recording is shown on FIG. 1. Various films (whose relative dimensions have not been observed in order to provide more clarity) are deposited and engraved in a semiconductive substrate 10 so as to form a magnetic circuit 12 with an airgap filled up by a nonmagnetic spacer 14 and a conductive winding 16. This winding 16 includes two sets of windings interconnected by a link 18; each set is wound around one magnetic pillar 20, 21. These magnetic pillars 20, 21 connect the first and second horizontal polar pieces 22, 23 of the circuit 12.

The winding 16 is connected at its two extremities by means of links 24, 26 traversing the substrate 10 to contact blocks 28, 30 disposed on the lower face of the substrate.

The track to be written and/or read 32 runs off above the airgap.

Various embodiments of such heads are described in the European patents EP-A-152 326 and EP-A-262 028.

Compared with this known thin film technology, another technique has been developed using the characteristics of materials with the Hall effect. Such materials make it possible to embody reading heads for extremely narrow recording tracks.

The document FR 2 518 792 describes a vertical magnetic head using a Hall effect sensor. Such a magnetic head is diagrammatically shown on FIG. 2. As can be observed on this figure, the Hall effect sensor 34 is disposed in a space situated between two polar pieces 36, 38. These polar pieces 36, 38 are placed vertically with respect to the magnetic recording medium 32 and are separated at the level of the section of the head close to the medium by a nonmagnetic spacer 40.

Such a magnetic head only comprises a single Hall effect sensor; it is thus subjected to thermal or electronic drifts, these drifts needing to be made up for.

FIG. 3 diagrammatically represents another known vertical magnetic head and comprising a Hall effect sensor. This magnetic head is described in detail in the document U.S. Pat. No. 3,800,193.

The polar pieces 36, 38 join up at each of their extremities. They are firstly separated by a nonmagnetic spacer 40 at the section of the polar pieces opposite the magnetic recording medium 32, and secondly by the Hall effect sensor 34.

This magnetic head exhibits the same drawbacks as the previous one.

SUMMARY OF THE INVENTION

The object of the present invention is to provide a horizontal magnetic head which includes at least one Hall effect sensor and which makes it possible to mitigate these drift problems by means of a simple differential measurement.

More specifically, the present invention concerns a horizontal magnetic head with the Hall effect and including contained in a recess formed in a semiconductive substrate a first horizontal polar piece, a second horizontal polar piece divided into two sections by a nonmagnetic spacer, a first magnetic pillar connecting the first polar piece to one section of the second polar piece, a second magnetic pillar connecting the first polar piece to the other section of the second polar piece, wherein at least one of the pillars comprises a Hall effect sensor. The position of the sensors in the upper part of the pillars is indifferent as regards functioning of the head.

The magnetic head of the invention is horizontal: they comprise two magnetic pillars, each able to integrate a Hall effect sensor. The presence of two sensors makes it possible to simply carry out a differential measurement of the read signals of a recorded magnetic medium delivered by each sensor and to obtain a drift-free signal. In addition, this signal has double the intensity of the signal delivered by a single sensor.

Advantageously, in the case when each pillar comprises a Hall effect sensor, these sensors are connected by outputs to the inputs of a differential circuit delivering a reading signal on one output.

The invention also has another advantage: it is possible to integrate on a single head both the reading means (whose Hall effect sensor(s) form a part of these means) and writing means, these reading and writing means making use of the same magnetic circuit. In this case, the magnetic head of the invention further includes a conductive winding surrounding the two magnetic pillars.

The object of the invention is to also provide a method to implement the head described above. According to this method, inside a recess formed in a semiconductor substrate:

the first horizontal polar piece is formed,
a first nonconducting film is deposited,
four conductive blocks are formed close to at least one of the extremities of the first horizontal polar piece, these blocks being able to be connected to the outside of the substrate,
a second nonconducting film is deposited on the unit,
in the nonconducting films unit, two openings are engraved reaching the extremities of the first horizontal polar piece,
these openings are filled with a magnetic material so as to constitute two magnetic half-pillars trimming flush the surface of the second nonconducting film,
a third nonconducting film is deposited on the unit,
in the second and third nonconducting films, openings reaching the conductive blocks are engraved,
a film of a material with the Hall effect is deposited on the unit,
this material film with the Hall effect is engraved so as to define the shape of each of the Hall effect sensors,
a fourth nonconducting film is deposited on the unit,
two magnetic half-pillars are embodied embedded in a fifth nonconducting film, these half-pillars being situated plumb with the already formed half-pillars,
the second magnetic horizontal polar piece is embodied embedded in a sixth nonconducting film.

so as to embody a reading and writing head, a conductive winding is further constituted surrounding the two magnetic pillars during the stage for embodying the conductive blocks.

The conductive blocks and the extremities of the winding (in the case of a reading/writing head) are connected by metal links to the outside of the substrate. These metal links are conventionally obtained, either by engraving of the rear face of the substrate and the first nonconducting film and metallization of the holes engraved, for example, prior to the stage for forming the conductive blocks, or by engraving the front face of the sixth, fifth and fourth nonconducting films and metallization of the engraved holes at the end of the manufacturing process.

BRIEF DESCRIPTION OF THE DRAWINGS

The characteristics and advantages of the invention shall appear more readily from a reading of the following description of embodiment examples, given by way of explanation and being in no way restrictive, with reference to the accompanying drawings in which:

FIG. 4 shows a first stage of a method for embodying the head of the invention, FIG. 5 shows a second stage of this method, FIG. 6 diagrammatically and partially represents a top view of the device after the second stage, FIG. 7 diagrammatically represents a third stage of this method.

DETAILED DESCRIPTION OF THE PREFERRED EMBODIMENTS

Figure 1:
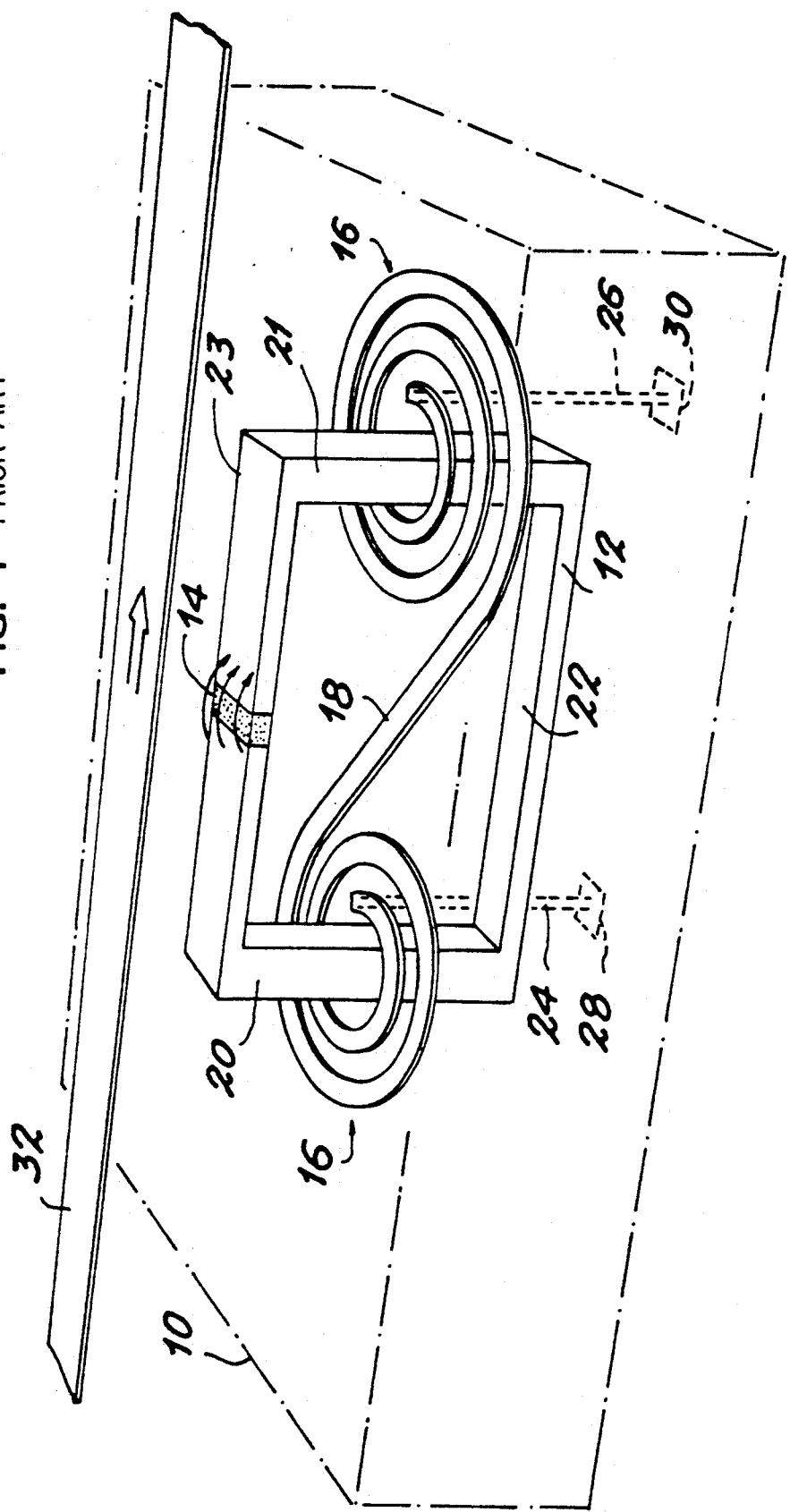
FIG. 1, already described, diagrammatically shows a horizontal magnetic head according to the prior art, FIG. 2, already described, diagrammatically shows the Hall effect magnetic head according to the prior art, FIG. 3, already described and relating to the prior art, diagrammatically shows another Hall effect magnetic head.

FIG. 4 shows a cutaway view of a semiconductive substrate made, for example, of silicon, in which a recess has been engraved. As described in the document EP-A-O 262 028, a horizontal magnetic film is made to increase at the bottom of this recess by means of electrolysis, this film being an FeNi film forming a first polar piece of the magnetic circuit.

The first polar piece 42 is coated with a nonconducting film 44 made of SiO$_2$, for example.

The next stages of the method for embodying a magnetic head conforming to the invention are described with reference to FIG. 5 which shows one section of the head.

Close to and preferably around each extremity of the first polar piece 42, four conductive blocks (only the blocks 46, 48 and 54, 56 are shown on the section) are deposited on the first nonconducting film 44, these blocks being surrounded with the windings of a conductive winding. This winding is formed of two sets of interconnected windings 62a and 62b.

The unit is coated with a second nonconducting film 64 made of SiO$_2$, for example, which is conventionally selectively engraved so as to form openings opposite the extremities of the first polar piece. These openings are filled by an electrolytic deposit so as to form two magnetic half-pillars 66, 68 made of FeNi trimming flush the surface of the second nonconducting film 64.

The unit is coated with a nonconducting film 70 made of SiO$_2$ with a thickness X being preferably slight, such as 0.2 micrometers.

Figure 6:
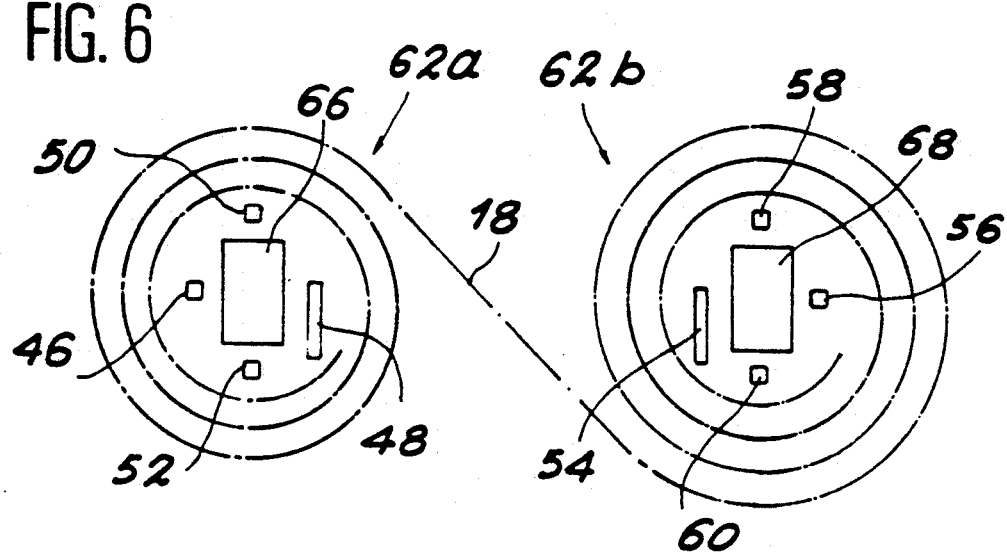

FIG. 6 shows a partial top view of the device after carrying out the previously described operations. This figure shows that the half-pillar 66 is surrounded by the conductive blocks 46, 48, 50, 52 and that the half-pillar 68 is surrounded by the conductive blocks 54, 56, 58 and 60.

The blocks 48 and 54 inside the magnetic circuit have an elongated strip shape so as to allow for a taking of contact without having to traverse the first polar piece 42, as shall be seen subsequently.

Each series 62a and 62b of the winding comprises about ten windings, for example.

Figure 7:
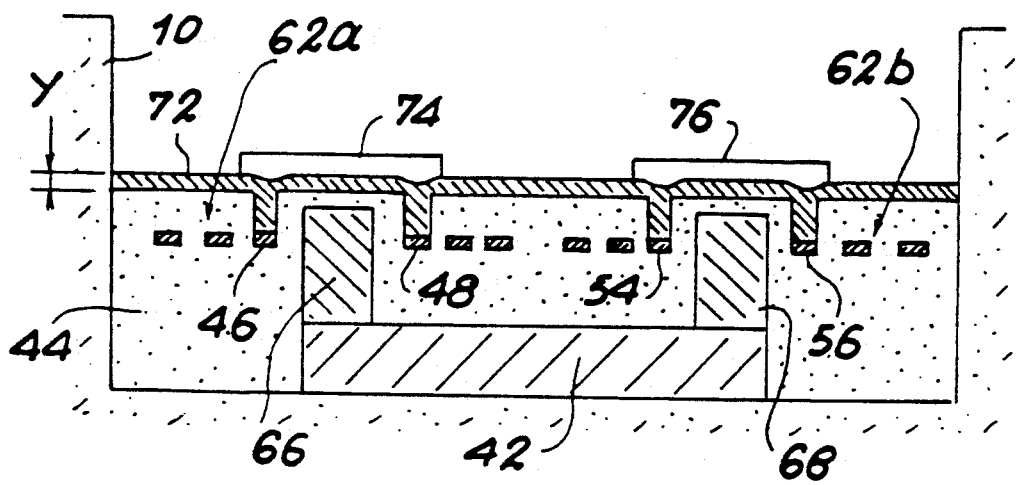

FIG. 7 shows the result of the following stages of the embodiment method concerning one cutaway view. By means of photolithography and engraving, openings are made in the nonconducting films 64 and 70. These openings reach the conductive blocks 46, 48, 50, 52, 54, 56, 58 and 60.

A Hall effect material film, made of InSb, for example, with a thickness Y equal to about 1 micrometer is disposed on the unit. This deposit is carried out by cathodic evaporation.

The shape of the sensors is defined by photolithography or engraving. FIG. 7 shows the resin mask 74, 76 making it possible to define the shape of the sensors at the time of engraving.

Figure 8:
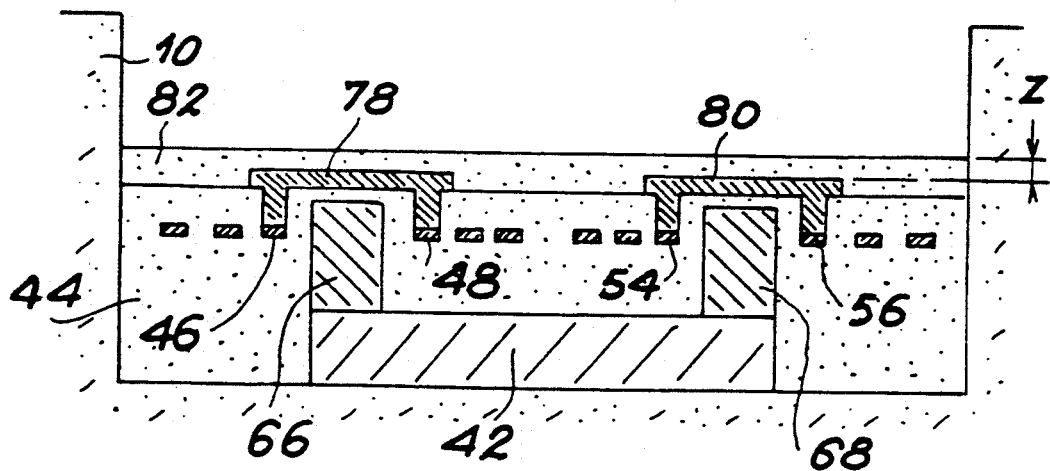
FIG. 8 shows a fourth stage of this method, FIG. 9 diagrammatically represents a top view of a Hall effect sensor, FIG. 10 diagrammatically represents a fifth stage of the method, FIG. 11 diagrammatically represents a cutaway view of the Hall effect magnetic head conforming to the invention.

FIG. 8 diagrammatically shows the result of the following stages of the embodiment method. The sensors 78 and 80 are engraved so as to be integrated into the magnetic pillars. They are connected to the conductive blocks on both sides of the half-pillars 66 and 68.

A fourth nonconducting film 82 made of SiO$_2$ with a thickness Z equal to 0.2 micrometers plumb with the sensors is deposited on the unit.

Figure 9:
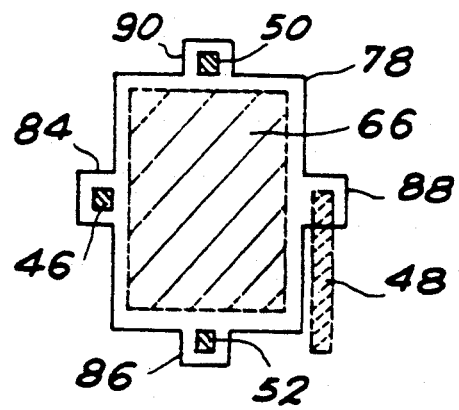

FIG. 9 diagrammatically shows a top view of a Hall effect sensor integrated in a magnetic pillar.

The sensor 78 shown has dimensions roughly larger than the section of the half-pillar 66. The sensor 78 is further provided with projecting flaps 84, 86, 88 and 90 for the contacts with the conductive blocks 46, 52, 48 and 50 respectively.

Figure 10:
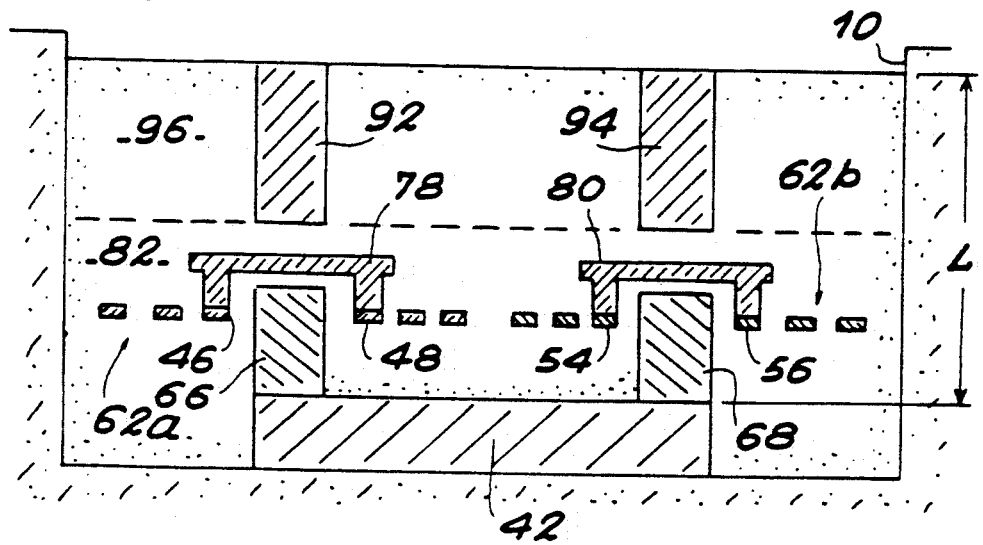

FIG. 10 diagrammatically illustrates the result of the next stages of the method. The upper half-pillars 92 and 94 are embodied plumb with the half-pillars 66 and 68 respectively. The half-pillars are made of FeNi, for example.

These half-pillars 92 and 94 are embodied in the openings made in the fifth nonconducting SiO$_2$ film 92 firstly deposited on the unit, either by cathodic evaporation of FeNi in this fifth film and surfacing, or by electrolysis.

In this latter case, firstly on the fifth nonconductive film provided with these openings, a conductive material is deposited by cathodic evaporation and then the selected magnetic material is electrolyzed by using the conductive material as an electrode, and finally the unit is surfaced or refined so as to form the pillars.

The overall height L of the pillars is equal to 10 micrometers.

Figure 11:
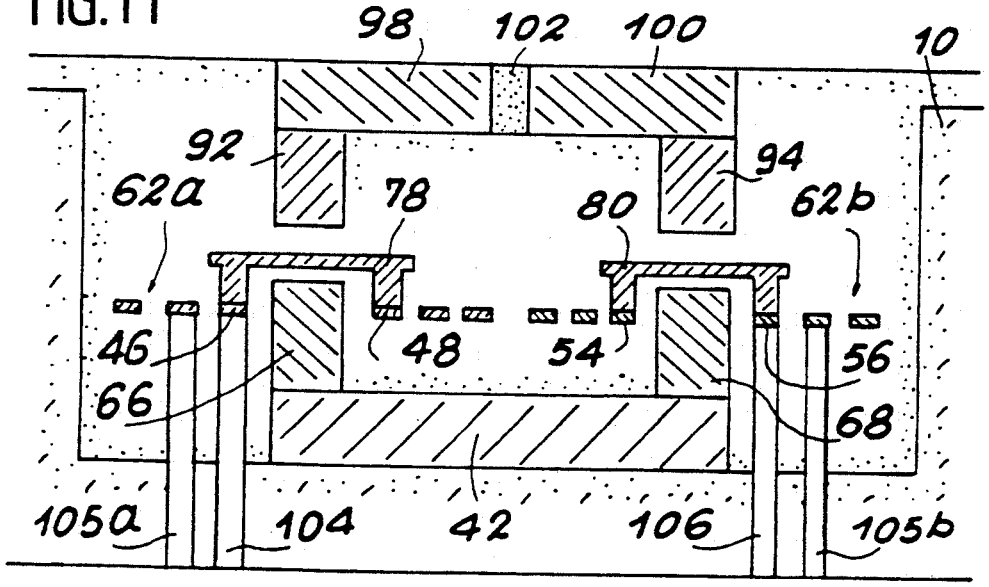

FIG. 11 diagrammatically represents a section of a magnetic head conforming to the invention at the end of the embodiment method.

An upper polar piece made of FeNi and separated into two sections 98 and 100 by a nonmagnetic spacer 102 is embodied in accordance with the technique described in the document EP-A-O 262 028 (FIGS. 5j, 5k, 5l and 5m).

FIG. 11 shows that the substrate 10 and the first nonconducting film 44 are pierced with openings (only two, namely 104 and 106, are shown on the cutaway view) allowing for access to the conductive blocks via behind the magnetic head. These openings enable the sensors 78 and 80 to be conventionally connected to firstly processing means, such as a differential circuit, and secondly to an electric power circuit.

Other openings 105a and 105b are pierced so as to allow for the embodiment of links between the winding and the feed means (not shown). One embodiment of these links is described in the document entitled "Electrical connection through silicon wafers" which appeared in the Journal of the Electrochemical Society - Fall Meeting, Chicago, 9 to 14 Oct. 1988.

The Hall effect sensors are only used for reading a magnetic signal recorded on a medium running off parallel to the second horizontal polar piece.

Figure 12A:
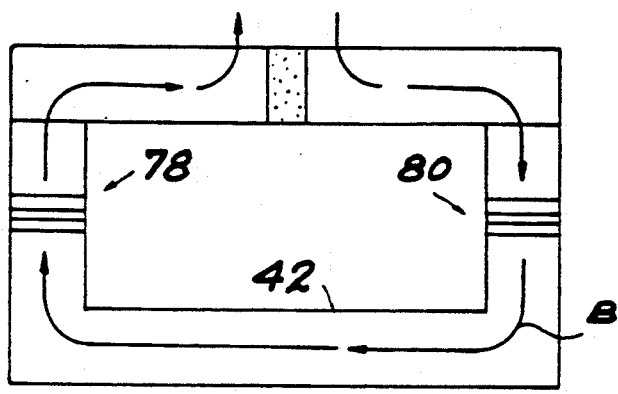
FIG. 12a shows the circulation of the magnetic field lines inside the magnetic circuit, and FIG. 12b diagrammatically represents the Hall effect sensors connected to a differential circuit in accordance with one embodiment of the invention.

As shown on FIG. 12a, the magnetic field lines B derived from the signal are contained inside the magnetic circuit (formed by the polar pieces and the pillars) by traversing the sensors 78 and 80 in opposing directions.

Figure 12B:
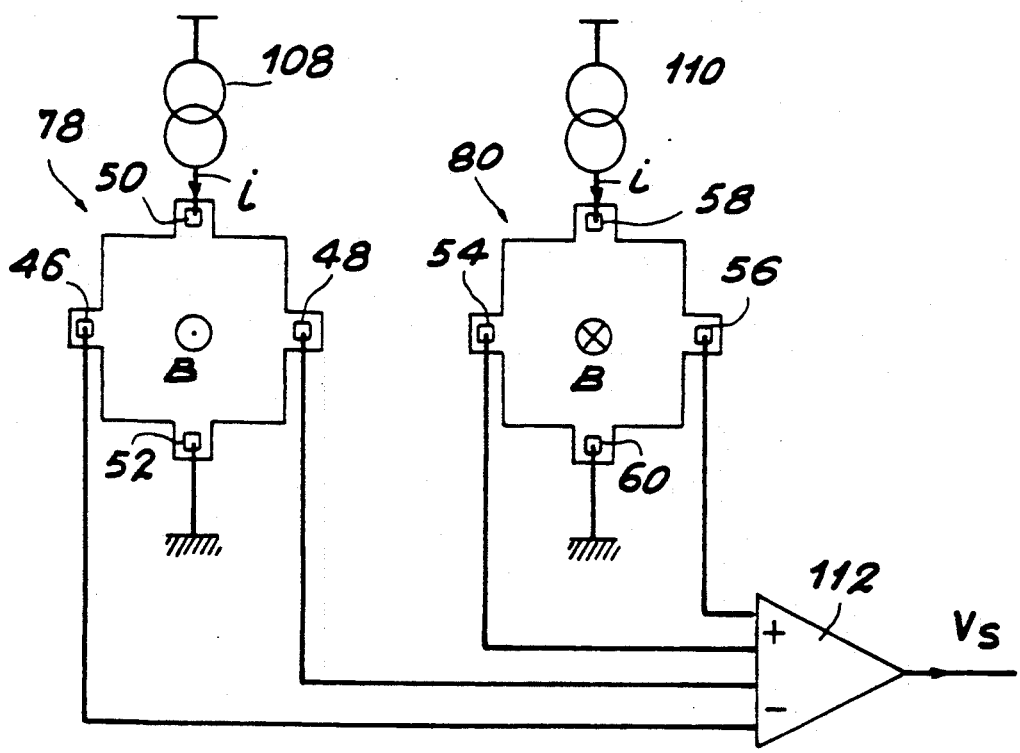

As shown in FIG. 12b, the sensors 78 and 80 are fed with current by current generators 108 and 110 respectively connected to the blocks 50 and 58. The blocks 52 and 60 are grounded.

The Hall voltage due to the crossing of the sensors by the magnetic field lines B is measured between the blocks 46 and 48 for the sensor 78, and 54 and 56 for the sensor 80. These voltages each include a Hall component due to the sensors being crossed by the magnetic field lines.

The voltages also include a component due to the noise added to the Hall component of one of the sensors and which is entrenched in the Hall component of the other of the sensors.

The Hall voltage delivered by the sensor 80 is applied to the input (+) of a differential circuit 112. The Hall voltage delivered by the sensor 78 is applied to the inputs (−) of this circuit 112. This circuit delivers an output signal VS having, not only a double amplitude of the signals delivered by each sensor, but also freed of any noise and in particular of any thermic or other form of drift eliminated at the time of differentiation. These Hall components are also of opposing signs.

The Hall effect magnetic head of the invention thus makes it possible to obtain a high amplitude reading signal freed from noise due to drifts. By way of example, this head has the following characteristics:

Sensitivity to a magnetic field of thin-layered Hall effect sensors: about 40 mV/mA.kGauss.

Amplitude of the field traversing the secondary airgaps formed at the level of the Hall effect sensors: about ±10 Gauss (with a typical polarization of the sensors of 2 mA).

Hall voltage collected at the terminals of a sensor: about 1.4 mVpp.

Amplitude of the reading signal after differentiation Vs: about 2.8 mVpp.

This latter figure represents a gain of about 20 with respect to the inductive heads using a reading winding. In addition, when the head is used for writing, the invention uses a winding, preferably with a small number of revolutions (for example, 10) so as to obtain a reduced magnetic circuit in order to compensate for the efficiency losses of the head on writing due to the secondary airgaps in the pillars so as to incorporate the Hall effect sensors.

It goes without saying that the invention is not merely restricted to the described embodiment example; on the other hand, the invention is applicable to all variants. In particular, in the embodiment example referred to above, the Hall effect magnetic head is able to be used for reading, but also for writing by virtue of the winding 62a, 62b. So as to obtain solely one reading head, it merely suffices to omit incorporating this winding when embodying the method.

Moreover, the deposits of the various magnetic materials in this case are electrolytic deposits, but it is possible to use any other type of deposit.

Finally, the device of the invention comprises two Hall effect sensors (one in each pillar), but a device comprising only one Hall effect sensor integrated in one of the two pillars may come within the context of the present invention.

What is claimed is:

1. A magnetic head comprising:
   a semiconductive substrate with a recess engraved therein, said recess having a bottom;
   a first polar piece formed on said bottom of said recess, said first polar piece having first and second extremities;
   a first magnetic pillar including a first half formed on said first extremity of said first polar piece and a second half located above said first half;
   a second magnetic pillar including a first half formed on said second extremity of said first polar piece and a second half located above said first half;
   a gap formed between the first and second halves of at least one of said first and second magnetic pillars;
   a HALL effect sensor located in said gap;
   a plurality of conductive blocks spaced around at least one of said first and second magnetic pillars and connected to said HALL effect sensor;
   a second polar piece having a first section in contact with said second half of said first magnetic pillar and a second section in contact with said second half of said second magnetic pillar;
   a non-magnetic spacer between said first and second sections of said second polar piece;
   openings pierced through said insulating substrate for access to said conductive blocks; and
   electrical connections within said openings for electrically connecting to said HALL effect sensor.

2. A magnetic head according to claim 1, wherein said first half of said first magnetic pillar is separated from said second half of said first magnetic pillar by a first gap and said first half of said second magnetic pillar is spaced from said second half of said second magnetic pillar by a second gap; and wherein
   a first HALL effect sensor is located in said first gap and a second HALL effect sensor is located in said second gap.

3. A magnetic head according to claim 1, further comprising:
   a conductive winding surrounding each of said first and second magnetic pillars.

* * * * *